United States Patent
Kim et al.

(10) Patent No.: US 10,693,540 B2
(45) Date of Patent: Jun. 23, 2020

(54) METHOD FOR PERIODICALLY TRANSMITTING UPLINK CONTROL INFORMATION IN WIRELESS COMMUNICATION SYSTEM AND APPARATUS FOR SAME

(71) Applicant: LG Electronics Inc., Seoul (KR)

(72) Inventors: Hyungtae Kim, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/482,579

(22) PCT Filed: Jan. 31, 2018

(86) PCT No.: PCT/KR2018/001337
§ 371 (c)(1),
(2) Date: Jul. 31, 2019

(87) PCT Pub. No.: WO2018/143667
PCT Pub. Date: Aug. 9, 2018

(65) Prior Publication Data
US 2020/0052748 A1 Feb. 13, 2020

Related U.S. Application Data

(60) Provisional application No. 62/454,898, filed on Feb. 6, 2017, provisional application No. 62/452,947, filed on Jan. 31, 2017.

(51) Int. Cl.
*H04B 7/04* (2017.01)
*H04B 7/0456* (2017.01)
*H04B 7/0417* (2017.01)

(52) U.S. Cl.
CPC ......... *H04B 7/0478* (2013.01); *H04B 7/0417* (2013.01)

(58) Field of Classification Search
CPC .. H04B 7/0632; H04B 7/0417; H04B 7/0617; H04B 7/0478; H04B 7/0452;
(Continued)

(56) References Cited

U.S. PATENT DOCUMENTS

2015/0078472 A1* 3/2015 Vook ............... H04B 7/0617 375/267
2016/0373224 A1 12/2016 Kim et al.
(Continued)

OTHER PUBLICATIONS

LG Electronics, "Discussion on feedback mechanism for eFD-MIMO," R1-1611749, 3GPP TSG RAN WG1 Meeting #87, Reno, USA, Nov. 14-18, 2016, 3 pages.
(Continued)

*Primary Examiner* — Emmanuel Bayard
(74) *Attorney, Agent, or Firm* — Fish & Richardson P.C.

(57) ABSTRACT

Disclosed in the present application is a method for a terminal periodically reporting, to a base station, channel state information on the basis of a linear combination codebook in a wireless communication system. Particularly, the method comprises the steps of: receiving a reference signal from the base station; and reporting channel state information which has been outputted to the base station on the basis of the reference signal, wherein the channel state information includes a channel quality indicator and information relating to a precoding matrix index, and when a rank outputted on the basis of the reference signal is 2, the precoding matrix index is selected from a codebook which has been sub-sampled, wherein a precoding matrix constituting the sub-sampled codebook comprises a first column vector for a first layer and a second column vector for a second layer that crosses the first column vector, wherein the information relating to the precoding matrix index indicates three co-phase coefficients defining the first column vector as a 4-bit size, and wherein three co-phase coefficients
(Continued)

defining the second column vector are identical to the three co-phase coefficients defining the first column vector.

10 Claims, 9 Drawing Sheets

(58) Field of Classification Search
CPC .... H04B 17/24; H04B 7/0619; H04B 7/0636; H04L 1/06; H04L 1/0693
USPC ................................ 375/219, 220, 267, 299
See application file for complete search history.

(56) References Cited

U.S. PATENT DOCUMENTS

2017/0047978 A1* 2/2017 Kim ..................... H04B 7/0626
2017/0257884 A1* 9/2017 Rahman ............... H04B 7/0421

OTHER PUBLICATIONS

Ericsson, "Rank-2 W2 Codebook for Advanced CSI Reporting," R1-1612664, 3GPP TSG-RAN WG1 #87, Reno, USA, Nov. 14-18, 2016, 5 pages.

Huawei, HiSilicon, "Design of quantized channel weighting in advanced CSI," R1-1611175, 3GPP TSG RAN WG1 Meeting #87, Reno, USA, Nov. 14-18, 2016, 6 pages.

NTT Docomo, "On Feedback Enhancements to Support Advanced CSI," R1-1612701, 3GPP TSG RAN WG1 Meeting #87, Reno, USA, Nov. 14-18, 2016, 6 pages.

PCT International Search Report and Written Opinion in International Application No. PCT/KR2018/001337, dated May 17, 2018, 16 pages (with English translation).

* cited by examiner (a) Control-plane protocol stack (b) User-plane protocol stack

METHOD FOR PERIODICALLY TRANSMITTING UPLINK CONTROL INFORMATION IN WIRELESS COMMUNICATION SYSTEM AND APPARATUS FOR SAME

CROSS-REFERENCE TO RELATED APPLICATIONS

This application is a National Stage application under 35 U.S.C. § 371 of International Application No. PCT/KR2018/001337, filed on Jan. 31, 2018, which claims the benefit of U.S. Provisional Application No. 62/454,898, filed on Feb. 6, 2017, and U.S. Provisional Application No. 62/452,947, filed on Jan. 31, 2017. The disclosures of the prior applications are incorporated by reference in their entirety.

TECHNICAL FIELD

The present invention relates to a wireless communication system, and more particularly, to a method for periodically transmitting uplink control information in a wireless communication system and an apparatus for the same.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARM)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

Based on the discussion above, a method for periodically transmitting uplink control information in a wireless communication system and an apparatus for the same are proposed.

Technical Solution

In one aspect of the present invention, provided herein a method for periodically reporting channel state information to a base station based on a linear combination codebook in a wireless communication system, the method including receiving a reference signal from the base station, and reporting, to the base station, channel state information calculated based on the reference signal, wherein the channel state information includes information about a channel quality indicator and a precoding matrix index, wherein, when a rank calculated based on the reference signal is 2, the precoding matrix index is selected from a subsampled codebook, wherein a precoding matrix constituting the subsampled codebook includes a first column vector for a first layer and a second column vector for a second layer, the second column vector being orthogonal to the first column vector, wherein the information about the precoding matrix index has a 4-bit size and indicates three co-phase coefficients defining the first column vector, and wherein three co-phase coefficients defining the second column vector are identical to three co-phase coefficients defining the first column vector.

In another aspect of the present invention, provided herein is a terminal of a wireless communication system, including a wireless communication module, and a processor connected to the wireless communication module and configured to calculate channel state information based on a reference signal received from a base station and to report the channel state information to the base station, wherein the channel state information includes information about a channel quality indicator and a precoding matrix index, wherein, when a rank calculated based on the reference signal is 2, the precoding matrix index is selected from a subsampled codebook, wherein a precoding matrix constituting the subsampled codebook includes a first column vector for a first layer and a second column vector for a second layer, the second column vector being orthogonal to the first column vector, wherein the information about the precoding matrix index has a 4-bit size and indicates three co-phase coefficients defining the first column vector, and wherein three co-phase coefficients defining the second column vector are identical to three co-phase coefficients defining the first column vector.

A first coefficient of the three co-phase coefficients may be indicated in two bits, wherein second and third coefficients of the three co-phase coefficients may each be indicated in one bit. More specifically, the first column vector and the second column vector may include a first element configured by linearly combining a leading beam indicator and a second beam indicator reflecting the first coefficient, and a second element configured by linearly combining a leading beam indicator reflecting the second coefficient and a second beam indicator reflecting the third coefficient. In this case, the second column vector may be configured by applying a walsh code to the first column vector.

The reporting of the channel state information may mean reporting first channel state information including information about the rank, reporting second channel state information including information about the leading beam indicator and the second beam indicator, and reporting third channel state information including information about the channel quality indicator and the precoding matrix index.

Advantageous Effects

According to embodiments of the present invention, in a wireless communication system, a terminal may periodically transmit uplink control information more efficiently.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Hereinafter, the structures, operations, and other features of the present invention will be understood readily from the embodiments of the present invention, examples of which are described with reference to the accompanying drawings. The embodiments which will be described below are examples in which the technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems corresponding to the aforementioned definition. In addition, although the embodiments of the present invention will herein be described based on Frequency Division Duplex (FDD) mode, the FDD mode is only exemplary and the embodiments of the present invention can easily be modified and applied to Half-FDD (H-FDD) mode or Time Division Duplex (TDD) mode.

In this specification, the term "base station (BS)" may be used as a generic term including a remote radio head (RRH), an eNB, a transmission point (TP), a reception point (RP), and a relay.

Figure 1:
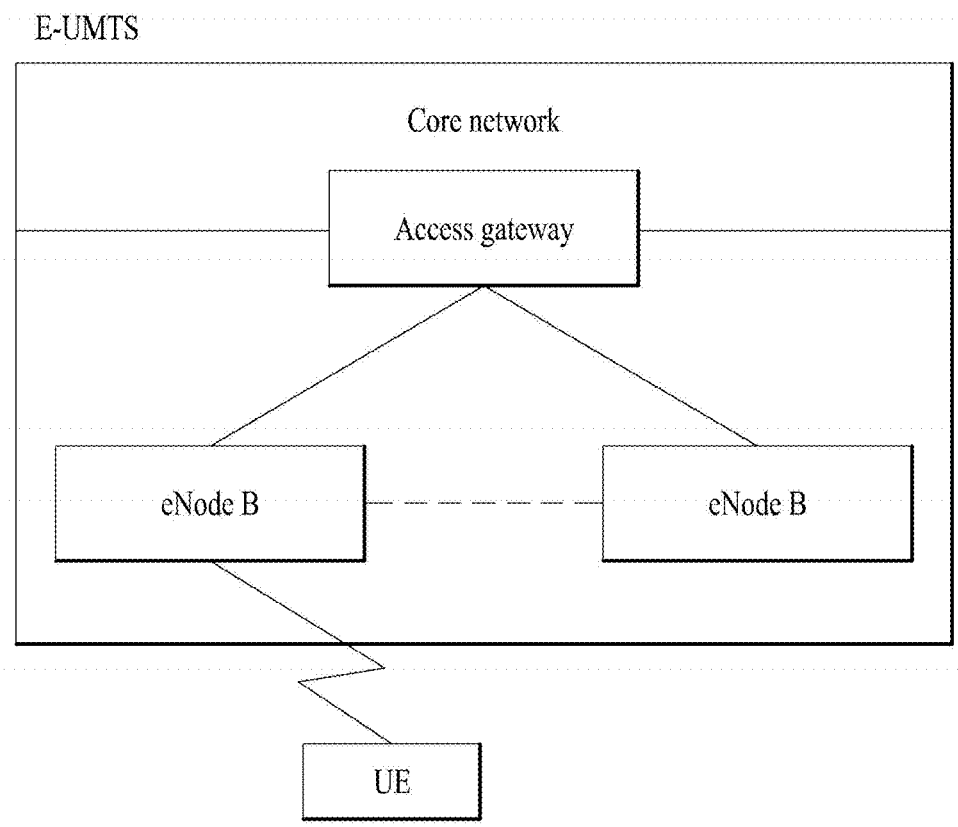
FIG. 1 is a diagram schematically illustrating a network structure of an E-UMTS as an exemplary radio communication system.
Figure 2:
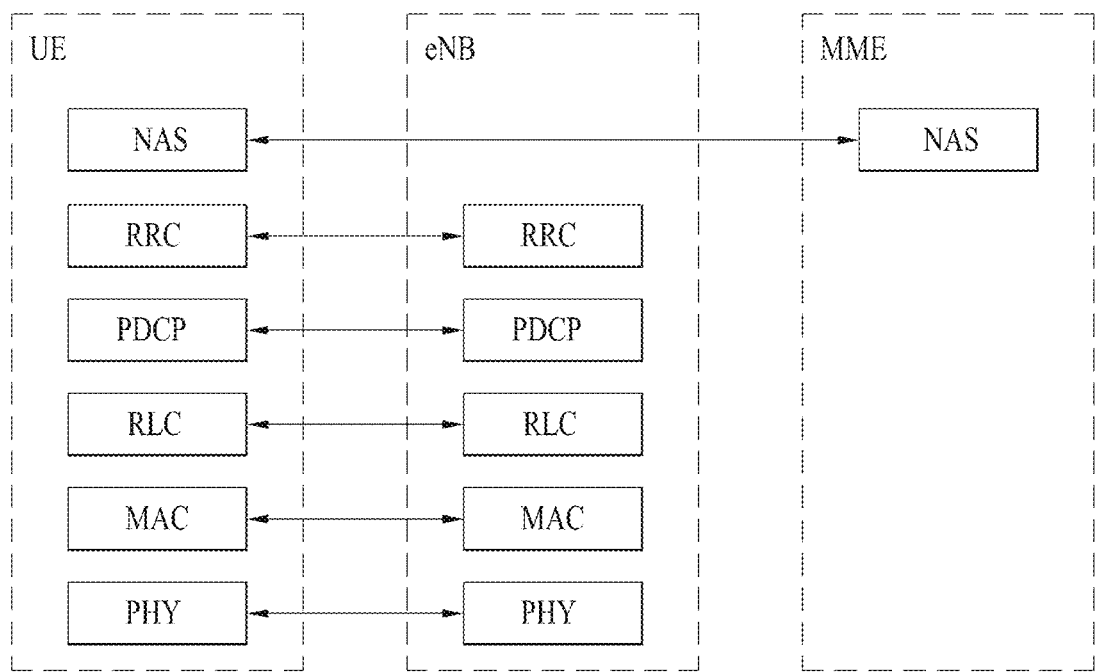
FIG. 2 is a diagram illustrating structures of a control plane and a user plane of a radio interface protocol between a UE and an E-UTRAN based on the 3GPP radio access network specification.
Figure 2:
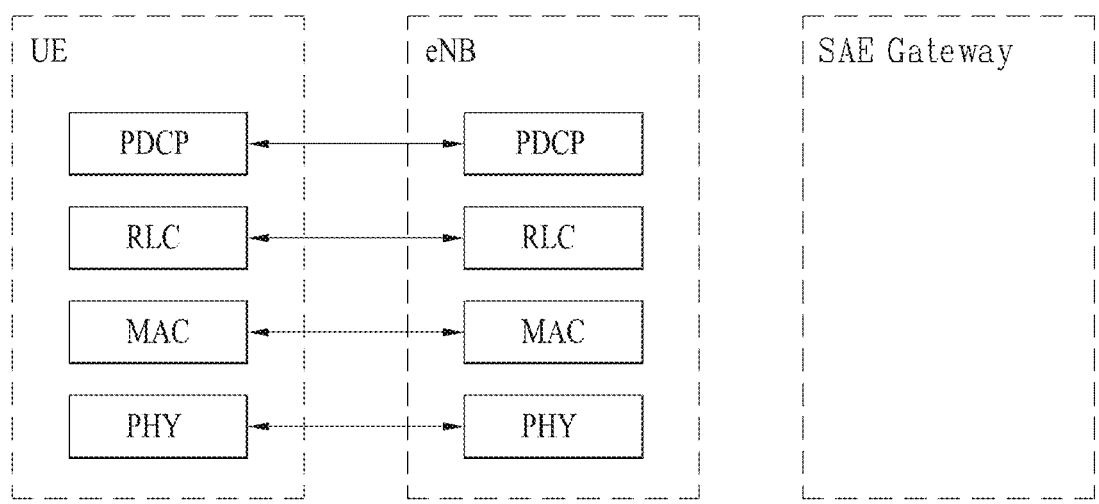

FIG. 2 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located at an upper level of the RRC layer performs functions such as session management and mobility management.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
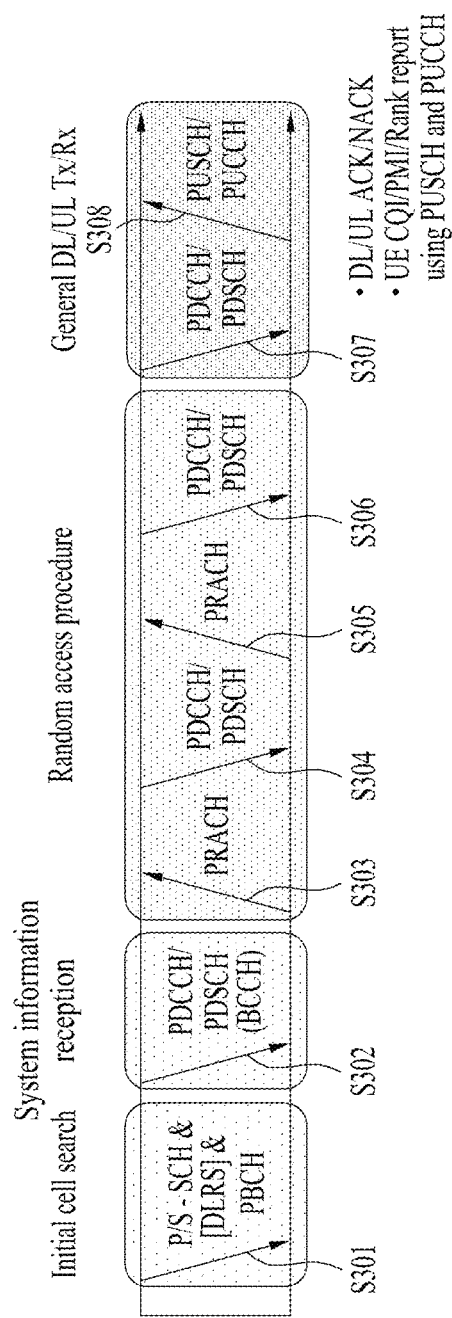
FIG. 3 is a diagram illustrating physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 4:
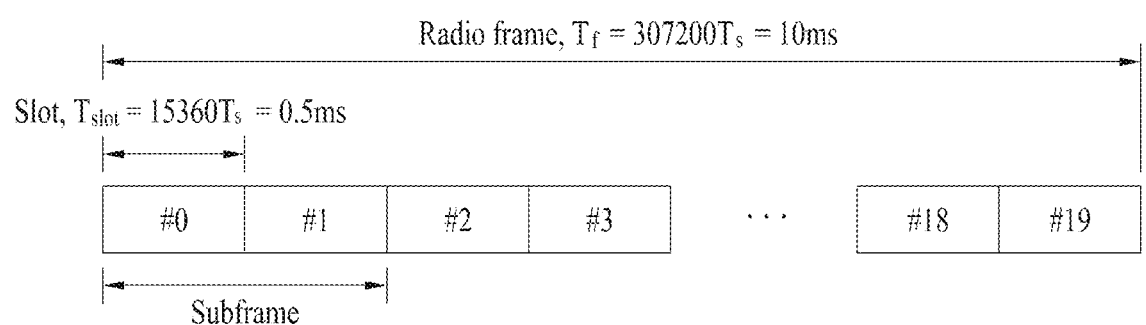
FIG. 4 is a diagram illustrating the structure of a radio frame used in an LTE system.

FIG. 4 is a view illustrating the structure of a radio frame used in an LTE system.

Referring to FIG. 4, the radio frame has a length of 10 ms (327200 Ts) and includes 10 equally-sized subframes. Each of the subframes has a length of 1 ms and includes two slots. Each of the slots has a length of 0.5 ms (15360 Ts). In this case, Ts denotes sampling time and is represented by Ts=1/(15 kHz×2048)=3.2552×10−8 (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
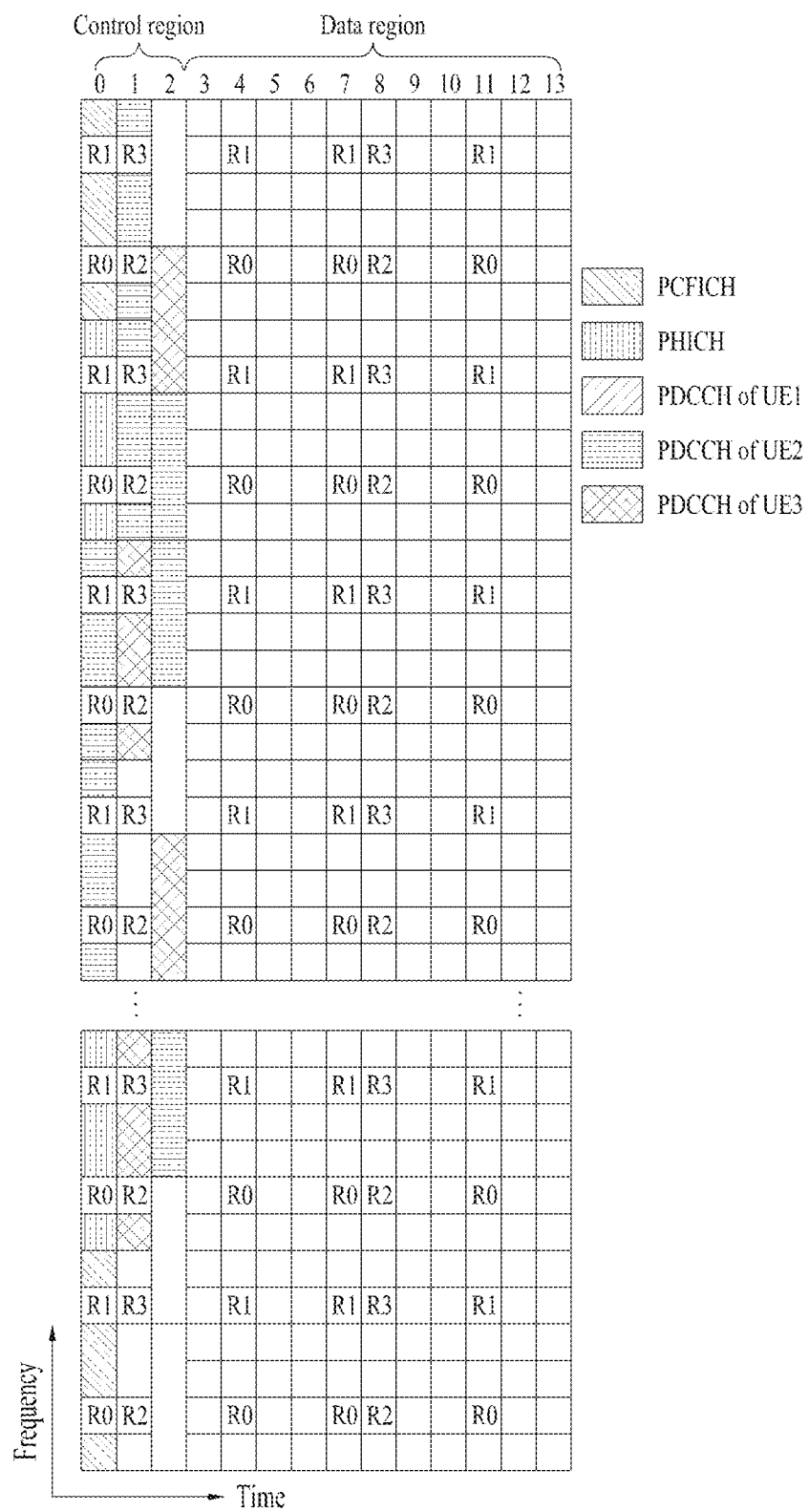
FIG. 5 is a diagram illustrating the structure of a DL radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
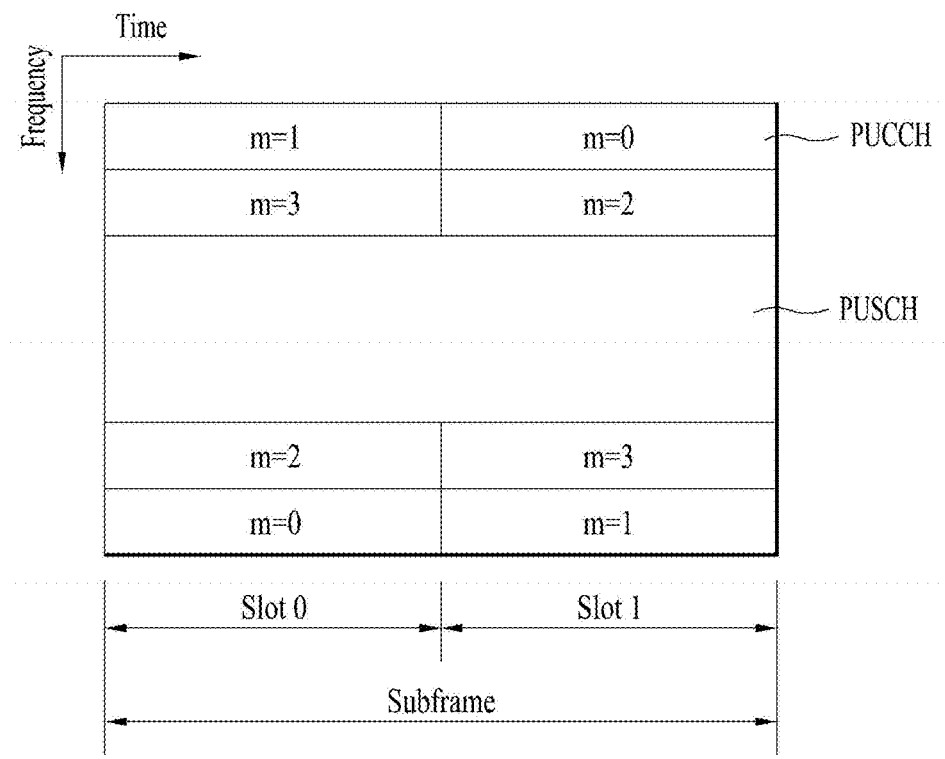
FIG. 6 is a diagram illustrating the structure of a UL subframe in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

The time for which a sounding reference signal can be transmitted in one subframe is an interval in which a symbol arranged last in the time domain is present in one subframe, and the signal is transmitted in a data transmission band in the frequency domain. The sounding reference signals of several UEs transmitted in the last symbol of the same subframe may be classified according to frequency positions.

The PUCCH may be used to transmit the following control information:

Scheduling Request (SR): Information used for requesting UL-SCH resources. The information is transmitted using an On-Off Keying (OOK) scheme.

HARQ-ACK: A response to a downlink data packet (e.g., codeword) on the PDSCH. This indicates whether the downlink data packet has been successfully received. 1-bit HARQ-ACK is transmitted in response to a single downlink codeword, and 2-bit HARQ-ACK are transmitted in response to two downlink codewords. The HARQ-ACK response includes positive ACK (simply, ACK), negative ACK (NACK), DTX or NACK/DTX.

Here, HARQ-ACK is used interchangeably with HARQ ACK/NACK and ACK/NACK.

Channel State Information (CSI): Feedback information on the downlink channel. Multiple Input Multiple Output (MIMO)-related feedback information includes a rank indicator (RI) and a precoding matrix indicator (PMI). 20 bits are used per subframe.

The amount of uplink control information (UCI) that the UE can transmit in a subframe depends on the number of SC-FDMAs available for control information transmission. The SC-FDMAs available for transmission of control information refers to the remaining SC-FDMA symbols excluding the SC-FDMA symbols for reference signal transmission in the subframe. In the case of a subframe in which a sounding reference signal (SRS) is configured, the last SC-FDMA symbol of the subframe is also excluded. The reference signal is used for coherent detection of the PUCCH. The PUCCH supports various formats depending on the information to be transmitted.

Table 1 shows a mapping relationship between the PUCCH format and the UCI in the LTE system.

TABLE 1

| PUCCH format | Unlink Control Information (UCI) |
|---|---|
| Format 1 | Scheduling Request (SR) (Non-modulated waveform) |
| Format 1a | 1-bit HARQ ACK/NACK (SR present/absent) |
| Format 1b | 2-bit HARQ ACK/NACK (SR present/absent) |
| Format 2 | CSI (20 coded bits) |
| Format 2 | CSI and 1-bit or 2-bit HARQ ACK/NACK (20 bits) (only for extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | Maximum of 24 bits of HARQ ACK/NACK + SR |

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
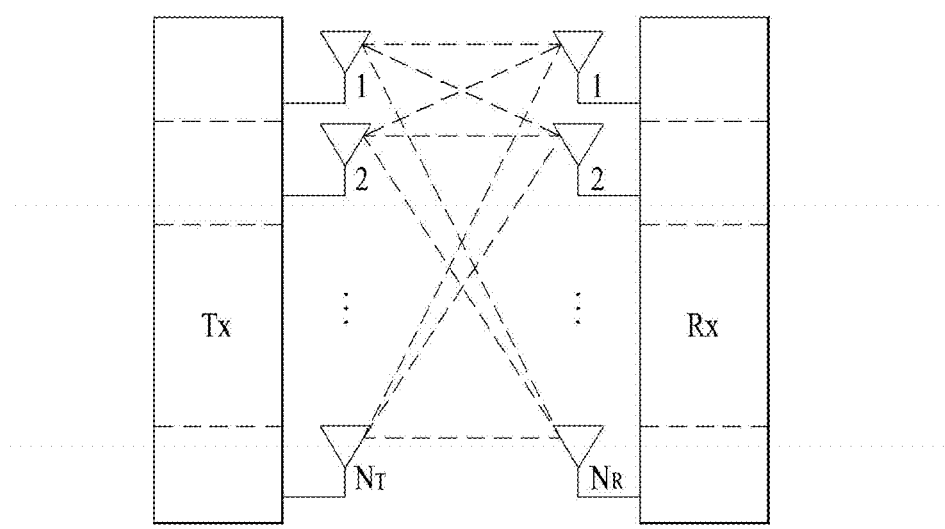
FIG. 7 is a diagram illustrating a configuration of a general MIMO communication system.

The configuration of a general MIMO communication system is shown in FIG. 7.

A transmitting end is equipped with NT transmission (Tx) antennas and a receiving end is equipped with NR reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is Ro, a transfer rate using multiple antennas can be theoretically increased by the product of the maximum transfer rate Ro by a rate increment Ri. The rate increment Ri is represented by the following equation 1 where Ri is the smaller of NT and NR.

$$R_i = \min(N_T, N_R) \quad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that NT Tx antennas and NR Rx antennas are present. In the case of a transmission signal, a maximum number of transmittable pieces of information is NT under the condition that NT Tx antennas are used, so that transmission information can be represented by a vector represented by the following equation 2:

$$s = [s_1, s_2, \ldots, s_{N_T}]^T \quad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ to be actually transmitted may be configured by multiplying the transmission power-controlled information vector $\hat{s}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\# \text{ of streams} \leq \text{rank}(H) \leq \min(N_T, N_R) \quad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

Now, a description of a Channel Status Information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

Accordingly, LTE-A standard has determined that a final PMI should be separately designed into W1, which a long-term and/or wideband PMI, and W2, which is a short-term and/or subband PMI.

An example of a hierarchical codebook transform scheme configuring one final PMI from among W1 and W2 may use a long-term covariance matrix of a channel as indicated in Equation 8:

$$W = \mathrm{norm}(W1\, W2) \quad \text{[Equation 8]}$$

In Equation 8, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9:

$$W1(i) = \begin{bmatrix} X_i & 0 \\ 0 & X_i \end{bmatrix}, \quad \text{[Equation 9]}$$

where $X_i$ is $Nt/2$ by $M$ matrix.

$$W2(j) = \overbrace{\begin{bmatrix} e_M^k & e_M^l & e_M^m \\ \alpha_j e_M^k & \beta_j e_M^l & \cdots & \gamma_j e_M^m \end{bmatrix}}^{r\ columns}$$

(if rank = $r$), where $1 \le k, l,$ $m \le M$ and $k, l, m$ are integer.

Here, NT indicates the number of Tx antennas. M is the number of columns of the matrix Xi and indicates that total M candidate column vectors exist in the matrix Xi. Moreover, ekM, elM and emM indicate kth, lth and mth column vectors of Xi, respectively as column vectors, in which kth, lth and mth elements correspond to 1 and the rest of elements correspond to 0 among M elements. αj, βj, and γj are complex values having unit norms and indicate that, when kth, lth and mth column vectors of the matrix Xi are selected, phase rotations are applied to the selected column vectors, respectively. Here, i is an integer equal to or greater than 0 and indicates a PMI index indicating W1. And, γj is an integer equal to or greater than 0 and indicates a PMI index indicating W2.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows:

$$W1(i) * W2(j) = \begin{bmatrix} X_i(k) \\ \alpha_j X_i(k) \end{bmatrix} \quad \text{[Equation 10]}$$

In Equation 10, a codeword is expressed as a vector of $N_T \times 1$ (where $N_T$ is the number of Tx antennas) and is structured with an upper vector $X_i(k)$ and a lower vector $\alpha_j X_i(k)$ which show correlation characteristics of a horizontal antenna group and a vertical antenna group, respectively. $x_i(k)$ is preferably expressed as a vector having the characteristics of linear phase increment by reflecting the characteristics of a correlation between antennas of each antenna group and may be a DFT matrix as a representative example.

In the LTE system, as described above, Chanel State Information (CSI) includes CQI, PMI, RI and the like, by which the CSI is non-limited. According to a transmission mode of each UE, CQI, PMI and RI may be transmitted all or in part. A case of transmitting CSI periodically is called a periodic reporting. A case of transmitting CSI in response to a request made by a base station is called an aperiodic reporting.

In case of the aperiodic reporting, a request bit included in UL scheduling information downloaded by a base station is transmitted to a UE. Thereafter, the UE delivers CSI considering a transmission mode of the UE to the base station through a UL data channel (PUSCH).

In case of the periodic reporting, a period, an offset in the corresponding period and the like are signaled per UE in subframe unit in a semi-static manner through a higher layer signal. Each UE delivers CSI considering a transmission mode to a base station according to a determined period through a UL control channel (PUCCH). If UL data simultaneously exists in a CSI transmitted subframe, CSI is transmitted through UL data channel (PUSCH) together with the data.

Referring to Table 2, periodic reporting of channel information may be divided into four types of reporting modes, i.e., Modes 1-0, 1-1, 2-0, and 2-1 according to the CQI and PMI feedback type.

TABLE 2

| | | PMI Feedback Type | |
|---|---|---|---|
| | | No PMI (OL, TD, single-antenna) | Single PMI (CL) |
| CQI Feedback Type | Wideband | Mode 1-0 RI (only for Open-Loop SM) One Wideband CQI (4 bit) | Mode 1-1 RI Wideband CQI (4 bit) |

TABLE 2-continued

| | PMI Feedback Type | |
|---|---|---|
| | No PMI (OL, TD, single-antenna) | Single PMI (CL) |
| UE Selected | when RI > 1, CQI a first codeword<br>Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Wideband spatial CQI (3 bit) for RI > 1<br>Wideband PMI (4 bit)<br>Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

CQI is divided into a wideband (WB) CQI and a subband (SB) (CQI) according to a CQI feedback type, and is divided into a "No" PMI and a single PMI according to whether to perform PMI transmission. In Table 2, No PMI corresponds to a case of an open-loop (OL), a transmit diversity (TD) and a single-antenna, and the single PMI corresponds to a closed-loop; CL).

Mode 1-0 is a case where there is no PMI transmission and WB CQI is transmitted. In this case, the RI is transmitted only in the case of open loop (OL) spatial multiplexing (SM), and one WB CQI represented in 4 bits may be transmitted. When the RI is greater than 1, the CQI for the first codeword may be transmitted. In Mode 1-0, feedback type 3 and feedback type 4 described above may be multiplexed and transmitted at different timings within the configured reporting period (which may be referred to as time division multiplexing (TDM) channel information transmission.

Mode 1-1 is a case where a single PMI and a WB CQI are transmitted. In this case, a 4-bit WB CQI and a 4-bit WB PMI may be transmitted along with RI transmission. Additionally, if the RI is greater than 1, a 3-bit windeband (WB) spatial differential CQI may be transmitted. In 2 codeword transmission, the WB spatial differential CQI may indicate the difference between the WB CQI index for codeword 1 and the WB CQI index for codeword 2. The difference may have one value in the set {−4, −3, −2, −1, 0, 1, 2, 3} and may be represented in 3 bits. In Mode 1-1, feedback type 2 and feedback type 3 described above may be multiplexed and transmitted at different timings within the configured reporting period.

Mode 2-0 is a case where there is no PMI transmission and the CQI of a UE selected band is transmitted. In this case, the RI is transmitted only in the case of open loop spatial multiplexing (OL SM), and the WB CQI represented in 4 bits may be transmitted. In addition, a Best-1 CQI may be transmitted in each bandwidth part (BP). The Best-1 CQI may be expressed in 4 bits. Further, an L-bit indicator indicating Best-1 may be transmitted as well. If the RI is greater than 1, the CQI for the first codeword may be transmitted. In Mode 2-0, feedback type 1, feedback type 3 and feedback type 4 described above may be multiplexed and transmitted at different timings within the configured reporting period.

Mode 2-1 is a case where a single PMI and a CQI of a UE selected band are transmitted. In this case, a 4-bit WB CQI, a 3-bit WB spatial differential CQI, and a 4-bit WB PMI may be transmitted along with RI transmission. Additionally, a 4-bit Best-1 CQI may be transmitted in each BP, and an L-bit Best-1 indicator may be transmitted as well. Additionally, if the RI is greater than 1, a 3-bit Best-1 spatial differential CQI may be transmitted. This may indicate the difference between the Best-1 CQI index of codeword 1 and the Best-1 CQI index of codeword 2 in 2 codeword transmission. In Mode 2-1, feedback type 1, feedback type 2 and feedback type 3 described above may be multiplexed and transmitted at different timings within the configured reporting period.

Additionally, the CSI reporting types defined in LTE Release-10 are disclosed below.

Type 1 report supports CQI feedback for a UE in a selected subband. Type 1a report supports subband CQI and second PMI feedback. Type 2, Type 2b, and Type 2c reports support wideband CQI and PMI feedback. Type 2a report supports broadband PMI feedback. Type 3 report supports RI feedback. Type 4 report supports wideband CQI. Type 5 report supports RI and broadband PMI feedback. Type 6 report supports RI and precoding type indicator (PTI) feedback.

Research has currently been actively conducted on introduction of an active antenna system (AAS) in next generation mobile communication. The AAS is a technology that can be more efficiently applied to perform beamforming or reduce interference by changing an antenna pattern according to circumstance.

When the AAS is configured as a two-dimensional AAS (2D-AAS), it is possible to more actively change a transmission beam according to a position of a receiving end by more efficiently and three-dimensionally adjusting a main lobe of an antenna in terms of antenna pattern.

Figure 8:
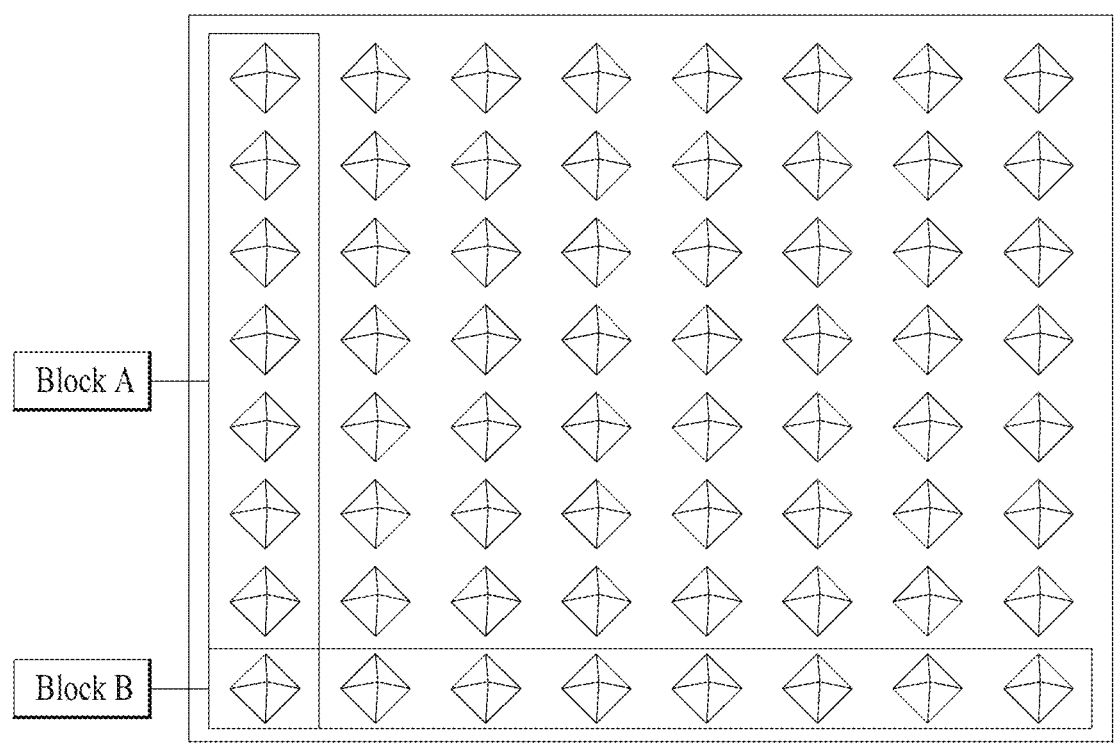
FIG. 8 shows an example of implementation of 2D-AAS.

FIG. 8 illustrates an example of implementation of the 2D-AAS. In particular, FIG. 8 presumes a co-polarized antenna array in which each antenna element has the same polarization. Referring to FIG. 8, the 2D-AAS is expected to be constructed as a system having a plurality of antennas by installing antennas in a vertical direction and a horizontal direction.

In a full dimension (FD)-MIMO system to which the 2D-AAS is applied, a BS may configure a plurality of CSI-RS resources for the UE in one CSI process. Here, the CSI process refers to an operation of feeding back channel information with an independent feedback configuration.

In such a case, the UE does not consider the CSI-RS resources configured in one CSI process as an independent channel, but assumes a single large CSI-RS resource by aggregating the resources and calculates and feeds back CSI on this resource. For example, the BS configures three 4-port CSI-RS resources for the UE in one CSI process, and the UE assumes one 12-port CSI-RS resource by aggregating the resources. The UE calculates and feeds back CSI on this CSI-RS resource using 12-port PMI. This reporting mode is referred to as Class A CSI reporting in the LTE-A system.

Alternatively, the UE assumes each CSI-RS resource as an independent channel, selects one of the CSI-RS resources, and calculates and reports CSI based on the selected resource. That is, the UE selects a CSI-RS having a strong channel among the eight CSI-RSs, calculates CSI based on the selected CSI-RS, and reports the CSI to the BS. At this time, the selected CSI-RS is additionally reported to the BS via a CSI-RS resource indicator (CRI). For example, if the channel of the first CSI-RS corresponding to T(0) is strongest, CRI is set to 0 and reported to the BS. This reporting mode is referred to as Class B CSI reporting in LTE-A systems.

To effectively exhibit this feature, parameters as introduced below may be defined for the CSI process in Class B. K denotes the number of CSI-RS resources present in one CSI process. Nk denotes the number of CSI-RS ports of the k-th CSI-RS resource.

In recent 3GPP standardization, a hybrid CSI is introduced to further improve the FD MIMO system. Details will be described with reference to the drawings.

Figure 9:
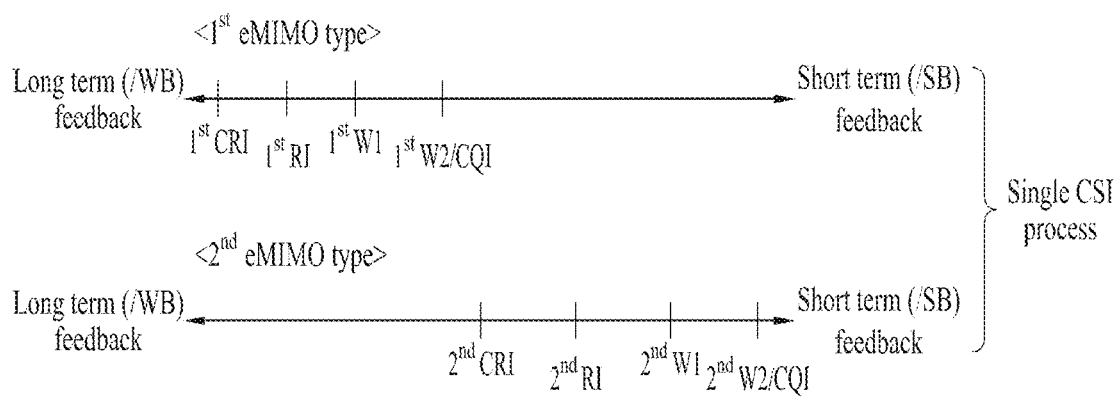
FIG. 9 is a diagram illustrating the concept of hybrid CSI.

FIG. 9 is a diagram illustrating the concept of hybrid CSI.

Referring to FIG. 9, there are two enhanced MIMO (eMIMO) types in a single CSI process. There is a CSI for each eMIMO type. The CSI of the first eMIMO type is fed back in a long term compared to the second eMIMO type or carries CSI information for the wideband (WB). That is, the BS configures a single CSI process composed of a first eMIMO type and a second eMIMO type for the UE (i.e., the BS delivers CSI process information through a higher layer). The BS changes the beamforming applied to the CSI-RS of the second eMIMO type using the CSI information of the first eMIMO type, and the UE reports the CSI based on the CSI-RS of the second eMIMO type.

In FIG. 9, the CSI of the first eMIMO type and the CSI of the second eMIMO type are referred to as a first CSI (i.e., a first CRI, a first RI, a first W1, a first W2, a first CQI) and a second CRI (a second CRI, a second RI, a second W1, a second W2, a second CQI).

Table 3 below exemplarily shows an operation mechanism of the hybrid CSI reflected in the 3GPP standardization. Specifically, in hybrid CSI reporting mechanism 1, whether transmission of the RI among the first CSIs is to be performed is yet to be determined (FFS), and W1 is reported. K, which denotes the number of CSI-RSs defined in one class B CSI process, is 1. Accordingly, the CRI among the second CSIs is not reported and RI, W2 and CQI are reported. Whether to report W1 is determined according to the Class B PMI configuration of the second eMIMO type that is RRC-signaled (namely, it is reported if the PMI configuration is 0 and is not reported if the configuration is 1). In hybrid CSI reporting mechanism 2, CRI is reported as the first CSI and RI, W1, W2 and CQI are reported as the second CSI.

Since the number of antenna ports has increased as in the case of FD-MIMO, 3GPP has recently defined W1 and W2 using a linear combination (LC) codebook as shown in Tables 4 and 5 below.

TABLE 4

$$W_1 = \begin{bmatrix} B & 0 \\ 0 & B \end{bmatrix}, B = \begin{bmatrix} p_0 b_{k_1^{(0)}, k_2^{(0)}}, \ldots, p_{L-1} b_{k_1^{(L-1)}, k_2^{(L-1)}} \end{bmatrix}$$

For rank 1: $W = \begin{bmatrix} \tilde{w}_{0,0} \\ \tilde{w}_{1,1} \end{bmatrix} = W_1 W_2$, and $W_2 = \begin{bmatrix} c_{0,0} \\ c_{1,0} \end{bmatrix}$ For rank 2: $W = \begin{bmatrix} \tilde{w}_{0,0} & \tilde{w}_{0,1} \\ \tilde{w}_{1,0} & \tilde{w}_{1,1} \end{bmatrix} = W_1 W_2$, and $W_2 = \begin{bmatrix} c_{0,0} & c_{0,1} \\ c_{1,0} & c_{1,1} \end{bmatrix}$ $c_{r,l} = [c_{r,l,0}, \ldots, c_{r,l,L-1}]^T$, $r = 0,1$, $l = 0,1$ $\tilde{w}_{r,l} = \sum_{i=0}^{L-1} b_{k_1^{(i)}, k_2^{(i)}} \cdot p_i \cdot c_{r,l,i}$; $r = 0, 1$, $l = 0, 1$ L (=2) is the number of beams
$b_{k_1, k_2}$ is a 2D DFT beam from oversampled grid
$k_1 = 0, 1, \ldots N_1 O_1 - 1$
$k_2 = 0, 1, \ldots N_2 O_2 - 1$
$0 \leq p_i \leq 1$ beam power scaling factor for beam i
$c_{r,l,i}$ beam combining coefficient for beam i and on polarization r and layer l

TABLE 5

| W1 Beam selection | W1 Beam power |
|---|---|
| $O_1 = O_2 = 4$ | Second beam power quantized |
| • If $N_2 = 1$, $O_2 = 1$ | with 2 bits |
| $2N_1 N_2 \in \{4, 8, 12, 16, 20, 24, 28, 32\}$ | • $p_0 = 1$, $p_1 \in \{1, \sqrt{0.5}, \sqrt{0.25}, 0\}$ |
| The leading (stronger) beam index: | W2 |
| – $k_1^{(0)} = 0, 1, \ldots N_1 O_1 - 1$ | $C_{0, 0, 0} = C_{0, 1, 0} = 1$ always |
| – $k_2^{(0)} = 0, 1, \ldots N_2 O_2 - 1$ | $C_{r, l, i} \in \{1, j, -1, -j\}$, $\forall i, r, l$ |
| The second (weaker) beam index: | |
| – $k_1^{(1)} = k_1^{(0)} + O_1 d_1$ | |
| – $k_2^{(1)} = k_2^{(0)} + O_2 d_2$ | |
| • $d_1 \in \{0, \ldots, \min(N_1, L_1) - 1\}$ | |
| • $d_2 \in \{0, \ldots, \min(N_2, L_2) - 1\}$ | |
| • $(d_1, d_2) \neq (0, 0)$ | |
| • Where $L_1$, $L_2$ are defined as: | |
| – If $N_1 \geq N_2$ and $N_2 \neq 1$ | |
| » $L_1 = 4$, $L_2 = 2$ | |
| – If $N_1 < N_2$ and $N_1 \neq 1$ | |
| » $L_2 = 4$, $L_1 = 2$ | |
| – If $N_2 = 1$ | |
| » $L_1 = 8$, $L_2 = 1$ | |

The codebooks for W1 and W2 configured through the procedures of Table 4 and Table 5 are disclosed in 3GPP TS 36.213 Release 15 Table 7.2.4-17C. That is, the LC codebook mentioned in the specification refers to the 3GPP TS 36.213 Release 15 Table 7.2.4-17C. In 3GPP TS 36.213 Release 15 Table 7.2.4-17C, i1 refers to W1 and i2 refers to W2.

TABLE 3

| Type | First CRI | First RI | First W1 | First W2/CQI | Second CRI | Second RI | Second W1 | Second W2 | Second CQI |
|---|---|---|---|---|---|---|---|---|---|
| Mechanism 1 | A + B w/ K = 1 | N.A. (Class A) | FFS | X | X (K = 1) | ○ | Depending on PMI config | ○ | ○ |
| Mechanism 2 | B + B | ○ (K > 1) | X | X | X (K = 1) | ○ | ○ | ○ | ○ |

In such a case, the codebook size for W1 and W2 is determined according to the rank as shown in Table 6 below.

TABLE 6

| Rank | W1 (bits) | W2 (bits) |
|---|---|---|
| 1 | 13 | 6 |
| 2 | 13 | 12 |

As described above, in the case of periodic PUCCH feedback, CSI is encoded and decoded using PUCCH format 2 (hereinafter referred to as PF2). PF2 is capable of transmitting a payload of up to 11 bits in a normal CP and a payload of up to 13 bits in an extended CP. However, when PMI or PMI and other CSI are simultaneously transmitted through PF2 due to increase of the number of antenna ports or the like as in the case of FD-MIMO, the codebook size is large and thus the payload size may exceed 11 bits. In addition, the index of the CQI also increases from 4 bits to 7 bits, thereby increasing overhead.

In the present invention, a method of applying codebook subsampling to generate a payload of 11 or fewer bits is proposed.

In the case of type 1a report in which subband (SB) W2 and an SB CQI are transmitted together, among the above-described reporting types, the CQI requires 4 bits and the SB indicator L requires 2 bits in rank 1, and accordingly W2 may use only 5 bits excluding 6 bits among the 11 bits. Therefore, codebook subsampling is required in W2 feedback for rank 1 using the LC codebook. Further, since the CQI is 7 bits and the SB indicator L is 2 bits at rank 2 or a higher rank, W2 may be fed back using only 2 bits excluding 9 bits among 11 bits. Accordingly, codebook subsampling is required even for W2 feedback for rank 2 using the LC codebook In the case of type 2b report in which a wideband (WB) W2 and a WB CQI are transmitted together, when the rank is 1, the CQI is 4 bits, and accordingly W2 may be fed back using a total of 7 bits. However, when the rank is 2 or higher, the CQI is 7 bits, and accordingly W2 should be transmitted using only 4 bits. Therefore, codebook subsampling is required even for W2 feedback for rank 2 using the LC codebook In type 1a report, when the rank is 2 or higher, a significant number of subsampling operations is required because W2, which is originally 12 bits, should be transmitted within 2 bits. As a result, codebook resolution may be excessively degraded and thus performance may be degraded. The type 1a report is used only when PTI is 1 in feedback mode 2-1. Accordingly, when the LC codebook is configured, the UE is limited in feedback mode 2-1 so as not to set PTI=1. (That is, the PTI is limited so as to be always set to 0). As a result, a case where W2 is excessively subsampled in the type 1a report and meaningless feedback is provided may be precluded. Alternatively, PTI=1 may be allowed, and when the PTI is 1, the UE may be limited so as not to report the rank higher than 2.

Alternatively, when the LC codebook configured, the BS may be limited so as not to configure Mode 2-1. Currently, the class A codebook is currently allowed to use only sub-mode 1 of Mode 1-1 and Mode 2-1 among the four PUCCH feedback modes. Accordingly, if the LC codebook is configured as a class A codebook, operation may be limited such that only sub-mode 1 of Mode 1-1 is used. If an LC codebook can be configured even in the class B codebook, reporting Mode 2-1 may be configured so as not to be configured.

<First Embodiment>

Hereinafter, a type 1a report and a subsampling method for feeding back a codebook of W2 represented in 6 bits at rank 1 within 5 bits according to a first embodiment of the present invention will be described.

A rank 1 precoder is represented by Equation 11 below. In the equation, b1 denotes a leading beam selected in W1 and b2 denotes a second beam selected in W1. That is, b1 and b2 are fed back in W1, and W2 is composed of c0,0,1, c1,0,0, and c1,0,1.

$$\begin{bmatrix} b1 + c0, 0, 1 * p1 * b2 \\ c1, 0, 0 * b1 + c1, 0, 1 * p1 * b2 \end{bmatrix} \quad [\text{Equation 11}]$$

c0,0,1 and c1,0,0 are freely selected in $\{1, j, -1, -j\}$ and fed back, while c1,0,1 is limited to c1,0,1=c0,0,1*c1,0,0 and is not fed back. As a result, W2 in 4 bits may be fed back. Then, Equation 11 may be changed to Equation 12. That is, the beam for the Vpol antenna and the beam for the Hpol antenna are the same among the cross polarization antennas, and there is only a phase difference between the beams corresponding to c1,0,0. Thus, the same structure as the codebook of Re 1-13 LTE is given. This structure is known to reflect the channel characteristics of the X-Pol antenna well.

$$\begin{bmatrix} b1 + c0, 0, 1 * p1 * b2 \\ c1, 0, 0 * (b1 + c0, 0, 1 * p1 * b2) \end{bmatrix} \quad [\text{Equation 12}]$$

Since subsampling is performed with a total of 4 bits in the above, there is a space for further 1-bit feedback through PF2. To further utilize the additional 1 bit, one of c1,0,1=c0,0,1*c1,0,0 or c1,0,1=j*c0,0,1*c1,0,0 may be selected and fed back.

When c1,0,1=j*c0,0,1*c1,0,0 is fed back, the beams for the Hpol and Vpol antennas may be different from each other, and accordingly beam of more various directions may be fed back. Similarly, when the additional 1 bit is further utilized, one of c1,0,1=c0,0,1*c1,0,0 or c1,0,1=-1*c0,0, 1*c1,0,0 may be selected and fed back.

<Second Embodiment>

Hereinafter, a type 1a report and a subsampling method at rank 2 according to a second embodiment of the present invention will be described.

Equation 13 below represents W of rank 2. In Equation 13, which is a rank 2 precoder, b1 and b2 are fed back in W1, and W2 is composed of c0,0,1, c1,0,0 and c1,0,1, which are the factors of a column vector for the first layer. In addition, W2 is composed of c0,1,1, c1,1,0 and c1,1,1, which are the factors of a column vector for the second layer.

$$\begin{bmatrix} b1+c0,0,1*p1*b2 & b1+c0,1,1*p1*b2 \\ c1,0,0*b1+c1,0,1*p1*b2 & c1,1,0*b1+c1,1,1*p1*b2 \end{bmatrix} \quad \text{Equation 13}$$

In the case of rank 2, in order to configure the beams of two layers so as to orthogonal to each other to minimize inter-layer interference, subsampling may be performed such that the precoding vectors of the two layers are orthogonal to each other. The following proposals are all designed to make the beams of two layers orthogonal.

As one method of subsampling, c0,0,1 is freely selected in {1, j, −1, −j} and fed back, but c1,0,0 is fixed to 1 and is limited to c1,1,0=−c1,0,0 so as not to be fed back. Furthermore, a limitation of c0,1,1=c1,0,1=c0,0,1 and c1,1,1=−c1,0,1 are imposed and a corresponding feedback is not provided.

As a result, W2 may be fed back in a total of 2 bits of payload. Thus, Equation 13 may be changed to Equation 14.

$$\begin{bmatrix} b1+c0,0,1*p1*b2 & b1+c0,0,1*p1*b2 \\ b1+c0,0,1*p1*b2 & -b1-c0,0,1*p1*b2 \end{bmatrix} \quad \text{Equation 14}$$

Referring to Equation 14, the beam for the Vpol antenna and the beam for the Hpol antenna are the same. The beam for the Vpol antenna and the beam for the Hpol antenna are fixed to the same phase in the first layer and the phase difference between the two beams is 180 degrees in the second layer. As a result, the final beams of the two layers are configured to be orthogonal to each other.

In Equation 14, the co-phase component is fixed. That is, it is fixed to 1 in the first layer and −1 in the second layer. In order to feed back the co-phase component, the phase coefficient used in combining b1 and b2, that is, c0,0,1 may be reduced from 2 bits to 1 bit, and the 1 bit may be allocated to the co-phase component to perform subsampling. As a result, by limiting the values of the following coefficient, the co-phase of 1 bit is fed back through c1,0,0, and the phase coefficient of 1 bit used for combination of b1 and b2 is fed back through c0,0,1.

First, c0,0,1∈{1,−1} may be set and b2 may be rotated by 0 degrees or 180 degrees to perform the combination operation. Alternatively, c0,0,1∈{1,j} may be set and b2 may be rotated by 0 degrees or 90 degrees to perform the combination operation. In addition, c1,0,0∈{1,j} may be set, a limitation may be imposed such that c1,1,0=−c1,0,0 and c0,1,1=c0,0,1, and feedback is not provided. As a result, Equation 13 may be changed to Equation 15.

$$\begin{bmatrix} b1+c0,0,1*p1*b2 & b1+c0,0,1*p1*b2 \\ c1,0,0*(b1+c0,0,1*p1*b2) & -c1,0,0*(b1+c0,0,1*p1*b2) \end{bmatrix} \quad \text{Equation 15}$$

In order to independently set a phase coefficient used for combining for each of Hpol and Vpol without the co-phase component, subsampling is performed as follows. The Hpol beam and the Vpol beam may be the same or different from each other as the phase coefficients used for combining for Hpol and Vpol are set independently. As a result, various channel directions may be expressed using the codebook.

c0,0,1∈{1,−1} may be set and b2 may be rotated by 0 degrees or 180 degrees to perform the combination operation. Alternatively, c0,0,1∈{1,j} may be set and b2 may be rotated by 0 degrees or 90 degrees to perform the combination operation. In addition, c1,0,1∈{1,−1} may be set and b2 may be rotated by 0 degrees or 180 degrees to perform the combination operation. Alternatively, c1,0,1∈{1,j} may be set and b2 may be rotated by 0 degrees or 90 degrees to perform the combination operation. Additionally, a limitation may be imposed such that c1,0,0=1, c0,1,1=c0,0,1, c1,1,0=−1, and c1,1,1=−c1,0,1, and feedback is not provided. As a result, Equation 13 may be changed to Equation 16.

$$\begin{bmatrix} b1+c0,0,1*p1*b2 & b1+c0,0,1*p1*b2 \\ b1+c1,0,1*p1*b2 & -b1-c1,0,1*p1*b2 \end{bmatrix} \quad \text{Equation 16}$$

<Third Embodiment>

Finally, a type 2b report and a subsampling method at rank 2 according to a third embodiment of the present invention will be described. As described above, in the case of the type 2b report in which WB W2 and WB CQI are transmitted together, when the rank is 2 or higher, the CQI is 7 bits, and accordingly W2 should be transmitted using only 4 bits.

1) First Approach

For this purpose, Equation 15 of the second embodiment and the corresponding limitation on the LC coefficient are used. To satisfy 4 bits, a limitation is imposed such that c0,0,1∈{1,−1,j,−j} and c1,0,0 {1,−1,j,−j}. A limitation is imposed such that c1,1,0=−c1,0,0 and c0,1,1=c0,0,1, and feedback is not provided. In addition, a limitation is imposed such that c1,0,1=c1,0,0*c0,0,1 and c1,1,1=−c1,0,0*c0,0,1, and feedback is not provided.

The co-phase component is fed back through c1,0,0. Accordingly, when c1,0,0 is set to 1 and −1, the mapping between the two layers and the beams is merely a permutation relationship. That is, when c1,0,0 is 1, the first layer is mapped to the first beam vector and the second layer is mapped to the second beam vector. On the other hand, when c1,0,0 is −1, the first layer is mapped to the second beam vector and the second layer is mapped to the first beam vector. As a result, there is no performance difference between a case where c1,0,0 is 1 and a case where c1,0,0 is −1. Similarly, there is no performance difference a case where c1,0,0 is j and a case where c1,0,0 is −j.

Therefore, c1,0,0∈{1,j} is preferably set. Thereby, the reduced 1 bit may be used for other c-coefficient feedback. If it is not used for feedback, the number of cases is reduced from 4 bits to 3 bits, and a coding gain may be obtained. Using the reduced 1 bit for other c-factor feedback will be described in the second approach below.

2) Second Approach

As described above, when c0,0,1 is limited to c0,0,1∈{1,−1,j,−j} and represented as 2-bit information, and c1,0,0 is limited to c1,0,0∈{1, j} and represented as 1-bit information, a limitation of $c1,0,1 \in \{1, -1\}$ may be imposed and b2 may be rotated by 0 degree or 180 degrees to perform the combination operation, or a limitation of $c1,0,1 \in \{1, j\}$ may be imposed and b2 may be rotated by 0 degree or 90 degrees to perform the combination operation. That is, $c1,0,1$ may be limited to $c1,0,1 \in \{1, -1\}$ (or $\{1, j\}$) and represented as 1-bit information.

Also, a limitation is imposed such that $c0,1,1=c0,0,1$, $c1,1,0=-c1,0,0$, and $c1,1,1=-c1,0,0*c1,0,1$, and thus any of $c0,1,1$, $c1,1,0$ and $c1,1,1$ is not fed back. As a result, Equation 13 may be changed to Equation 17. According to Equation 17, W2 may be expressed as information on $c0,0,1$ which is 2 bits, information on $c1,0,0$ which is 1 bit and information on $c1,0,1$ which is 1 bit, i.e., information of 4 bits.

$$\begin{bmatrix} b1+c0,0,1*p1*b2 & b1+c0,0,1*p1*b2 \\ c1,0,0*(b1+c1,0,1*p1*b2) & -c1,0,0*(b1-c1,0,1*p1*b2) \end{bmatrix}$$ Equation 17

In summary, the UE reports only the matrices satisfying Equation 17 in the entire LC codebook to the BS as a precoder for W2. In particular, a column vector corresponding to the second layer is subjected to a walsh code so as to be orthogonal to a column vector corresponding to the first layer to be orthogonal. For the column vector corresponding to the first layer and the column corresponding to the second layer, it may be seen that the coefficients indicating a co-phase are the same as $c0,0,1$, $c1,0,0$ and $c1,0,1$. Specifically, $c0,0,1$ is indicated in 2 bits, and $c1,0,0$ and $c1,0,1$ are indicated by 1 bit, respectively. Thus, W2 is expressed in 4 bits.

In addition, Equation 17 may be further simplified to Equation 18 below. In particular, it can be seen from Equation 18 that $c1,0,0*(b1+c1,0,1*p1*b2)$ is simplified to $c1,0,0*b1+c1,0,1*p1*b2$. More specifically, it can be seen that $c1,0,1*p1*b2$ is obtained by excluding only the factor $c1,0,0$ from $c1,0,0*p1*b2$ $$\begin{bmatrix} b1+c0,0,1*p1*b2 & b1+c0,0,1*p1*b2 \\ c1,0,0*b1+c1,0,1*p1*b2 & -c1,0,0*b1-c1,0,1*p1*b2 \end{bmatrix}$$ Equation 18

3) Third Approach

In the above, $c0,0,1$ and $c1,0,1$ are limited to $c0,0,1 \in \{1,-1,j,-j\}$ and $c1,0,0 \in \{1,j\}$, respectively, a total of eight combinations are possible. Of the eight combinations, only two combinations satisfy $c0,0,1=c1,0,1$.

In Equation 17, when $c0,0,1=c1,0,1$, the beam for the Vpol antenna and the beam for the Hpol antenna are the same, and there is only a phase difference between the beams corresponding to $c1,0,0$. Thus, the same structure as the codebook of Re 1-13 LTE is given. This structure is known to reflect the channel characteristics of the X-Pol antenna well.

Therefore, in order to increase the combinations satisfying $c0,0,1=c1,0,1$, a modification may be made such that $c1,0,1$ is selected independently from $c0,0,1$ in $\{1, -1\}$ (or $\{1, j\}$). Of course, all c coefficients except $c1,0,1$ are as described above in the second approach. When one-bit feedback is used to allow the UE to select/report $c1,0,1=c0,0,1$ or $c1,0,1=-c0,0,1$, $c0,0,1$ and $c1,0,1$ satisfy $c0,0,1=c1,0,1$ for four combinations among the eight combinations. Alternatively, the UE may be allowed to select $c1,0,1=c0,0,1$ or $c1,0,1=j*c0,0,1$ using one bit.

4) Fourth Approach

Lastly, a limitation of $c0,0,1 \in \{1,-1,j,-j\}$ and $c1,0,1 \in \{1,-1,j,-j\}$ may be imposed to apply sub sampling in 2 bits and configure the other c coefficients in the same manner as described above in the third approach.

Figure 10:
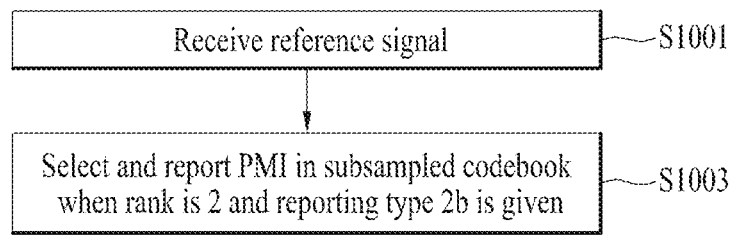
FIG. 10 illustrates an example in which a UE reports channel state information to a base station according to an embodiment of the present invention.

FIG. 10 illustrates an example in which a UE reports channel state information to a base station according to an embodiment of the present invention.

Referring to FIG. 10, in step 1001, a UE receives a reference signal from a BS. In step 1003, the UE reports channel state information to the BS. In particular, the present invention includes a case where first CSI including information about a rank is reported, second CSI including information about the leading beam indicator and the second beam indicator is reported, and third CSI including information about the CQI and the precoding matrix index is reported. In particular, when the rank calculated based on the reference signal is 2, the precoding matrix index is selected in a subsampled codebook, and the precoding matrix constituting the subsampled codebook includes a first column vector for the first layer and a second column vector for the second layer, the second column vector being orthogonal to the first column vector. The information about the precoding matrix index has a 4-bit size and indicates three co-phase coefficients defining the first column vector. Three co-phase coefficients defining the second column vector are identical to the three co-phase coefficients defining the first column vector.

More specifically, a first one of the three co-phase coefficients is indicated in two bits, and second and third coefficients of the three co-phase coefficients are each indicated in one bit. In addition, the first column vector and the second column vector include a first element configured by linearly combining a leading beam indicator with a second beam indicator reflecting the first coefficient; and a second element configured by linearly combining a leading beam indicator reflecting the second coefficient and a second beam indicator reflecting the third coefficient. In particular, the second column vector is configured by applying the walsh code to the first column vector.

Figure 11:
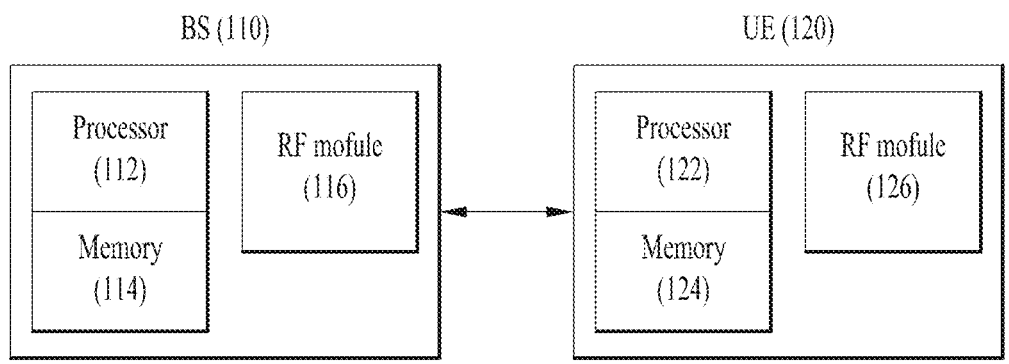
FIG. 11 shows a base station and user equipment applicable to an embodiment of the present invention.

FIG. 11 shows a base station and user equipment applicable to an embodiment of the present invention.

Referring to FIG. 11, a wireless communication system includes a Base Station (BS) 110 and a User Equipment (UE) 120. The BS 110 includes a processor 112, a memory 114 and a Radio Frequency (RF) unit 116. The processor 112 may be configured to implement procedures and/or methods proposed by the present invention. The memory 114 is connected to the processor 112 and stores various kinds of information related to operations of the processor 112. The RF unit 116 is connected to the processor 112 and transmits and/or receives a wireless signal. The UE 120 includes a processor 122, a memory 124 and an RF unit 126. The processor 122 may be configured to implement procedures and/or methods proposed by the present invention. The memory 124 is connected to the processor 122 and stores various kinds of information related to operations of the processor 122. The RF unit 126 is connected to the processor 122 and transmits and/or receives a wireless signal. The BS 110 and/or UE 120 may have a single antenna or multiple antennas.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this disclosure, a specific operation explained as performed by a base station may be performed by an upper node of the base station in some cases. In particular, in a network constructed with a plurality of network nodes including a base station, it is apparent that various operations performed for communication with a mobile station can be performed by a base station or other networks except the base station. Herein, a base station may be substituted with such a terminology as a fixed station, a Node B, an eNode B (eNB), an access point (AP) or the like.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

The memory unit is provided within or outside the processor to exchange data with the processor through the various means known to the public.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although a method for periodically transmitting uplink control information in a wireless communication system and an apparatus for the same have been described focusing on an example in which the method and the apparatus are applied to the 3GPP LTE system, the method and the apparatus are applicable to various wireless communication systems in addition the 3GPP LTE system.

The invention claimed is:

1. A method for periodically reporting channel state information to a base station based on a linear combination codebook in a wireless communication system, the method comprising:
   receiving a reference signal from the base station; and
   reporting, to the base station, channel state information calculated based on the reference signal,
   wherein the channel state information comprises information about a channel quality indicator and a precoding matrix index,
   wherein, when a rank calculated based on the reference signal is 2, the precoding matrix index is selected from a subsampled codebook,
   wherein a precoding matrix constituting the subsampled codebook comprises a first column vector for a first layer and a second column vector for a second layer, the second column vector being orthogonal to the first column vector,
   wherein the information about the precoding matrix index has a 4-bit size and indicates three co-phase coefficients defining the first column vector, and
   wherein three co-phase coefficients defining the second column vector are identical to the three co-phase coefficients defining the first column vector.

2. The method of claim 1, wherein a first coefficient of the three co-phase coefficients is indicated in two bits,
   wherein each of second and third coefficients of the three co-phase coefficients is indicated in one bit.

3. The method of claim 2, wherein the first column vector and the second column vector comprise:
   a first element configured by linearly combining a leading beam indicator and a second beam indicator reflecting the first coefficient; and
   a second element configured by linearly combining a leading beam indicator reflecting the second coefficient and a second beam indicator reflecting the third coefficient.

4. The method of claim 3, wherein the second column vector is configured by applying a walsh code to the first column vector.

5. The method of claim 3, wherein the reporting comprises:
   reporting first channel state information comprising information about the rank;
   reporting second channel state information comprising information about the leading beam indicator and the second beam indicator; and
   reporting third channel state information comprising information about the channel quality indicator and the precoding matrix index.

6. A terminal in a wireless communication system, comprising:
   a wireless communication module; and
   a processor connected to the wireless communication module and configured to calculate channel state information based on a reference signal received from a base station and to report the channel state information to the base station,
   wherein the channel state information comprises information about a channel quality indicator and a precoding matrix index, wherein, when a rank calculated based on the reference signal is 2, the precoding matrix index is selected from a subsampled codebook, wherein a precoding matrix constituting the subsampled codebook comprises a first column vector for a first layer and a second column vector for a second layer, the second column vector being orthogonal to the first column vector, wherein the information about the precoding matrix index has a 4-bit size and indicates three co-phase coefficients defining the first column vector, and wherein three co-phase coefficients defining the second column vector are identical to the three co-phase coefficients defining the first column vector.

7. The terminal of claim 6, wherein a first coefficient of the three co-phase coefficients is indicated in two bits, wherein each of second and third coefficients of the three co-phase coefficients is indicated in one bit.

8. The terminal of claim 7, wherein the first column vector and the second column vector comprise:

a first element configured by linearly combining a leading beam indicator and a second beam indicator reflecting the first coefficient; and a second element configured by linearly combining a leading beam indicator reflecting the second coefficient and a second beam indicator reflecting the third coefficient.

9. The terminal of claim 8, wherein the second column vector is configured by applying a walsh code to the first column vector.

10. The terminal of claim 9, wherein the processor is configured to:

report first channel state information comprising information about the rank;

report second channel state information comprising information about the leading beam indicator and the second beam indicator; and report third channel state information comprising information about the channel quality indicator and the precoding matrix index.

\* \* \* \* \*